United States Patent
Holtmanns et al.

(10) Patent No.: US 8,990,897 B2
(45) Date of Patent: *Mar. 24, 2015

(54) GENERIC KEY-DECISION MECHANISM FOR GAA

(75) Inventors: Silke Holtmanns, Vantaa (FI); Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 643 days.

This patent is subject to a terminal disclaimer.

(21) Appl. No.: 13/239,246

(22) Filed: Sep. 21, 2011

(65) Prior Publication Data

US 2012/0011574 A1    Jan. 12, 2012

Related U.S. Application Data

(63) Continuation of application No. 11/184,931, filed on Jul. 20, 2005, now Pat. No. 8,046,824.

(60) Provisional application No. 60/669,873, filed on Apr. 11, 2005.

(51) Int. Cl.
*H04L 29/06*    (2006.01)
*H04W 12/04*    (2009.01)

(52) U.S. Cl.
CPC ............. *H04L 63/062* (2013.01); *H04W 12/04* (2013.01)
USPC .................................................. 726/4; 726/5

(58) Field of Classification Search
CPC ............................ H04L 63/062; H04W 12/04
USPC ..................................................... 726/3, 4, 5
See application file for complete search history.

(56) References Cited

U.S. PATENT DOCUMENTS

| | | | |
|---|---|---|---|
| 6,338,140 B1 * | 1/2002 | Owens et al. .................. | 713/168 |
| 7,545,768 B2 * | 6/2009 | Haverinen et al. ............. | 370/328 |
| 7,715,822 B2 * | 5/2010 | Semple et al. ................. | 455/411 |
| 2002/0052885 A1 * | 5/2002 | Levy .............................. | 707/200 |
| 2003/0131251 A1 * | 7/2003 | Fetkovich ...................... | 713/193 |
| 2004/0093279 A1 * | 5/2004 | Yamanoue et al. ............. | 705/26 |
| 2005/0094593 A1 * | 5/2005 | Buckley ......................... | 370/328 |
| 2005/0102501 A1 | 5/2005 | Haukka et al. | |
| 2005/0154913 A1 * | 7/2005 | Barriga et al. ................. | 713/201 |

(Continued)

FOREIGN PATENT DOCUMENTS

| WO | WO-2005088896 A1 | 9/2005 |
|---|---|---|
| WO | WO-2006084183 A1 | 8/2006 |

OTHER PUBLICATIONS

ETSI, ETSI TS 133 220 V6.3.0, Universal Mobile Telecommunications System (UMTS); Generic Authentication Architecture (GAA); Generic bootstrapping architecture (3GPP TS 33.220 version 6.3.0 Release 6), Dec. 2004.*

(Continued)

*Primary Examiner* — David García Cervetti
(74) *Attorney, Agent, or Firm* — Mintz Levin Cohn Ferris Glovsky and Popeo, P.C.

(57) ABSTRACT

A method and apparatus provide generic mechanism for a network application server. A receiver receives a request from a user equipment to provide authentication information to a network application function. A determining unit determines a key of a generic authentication architecture to integrate additional network application servers by extending an existing standard for user security settings. A providing unit provides the authentication information to the network application function.

7 Claims, 4 Drawing Sheets

(56) References Cited

U.S. PATENT DOCUMENTS

| | | | |
|---|---|---|---|
| 2005/0246548 A1 | 11/2005 | Laitinen | |
| 2005/0259825 A1* | 11/2005 | Trifonov | 380/277 |
| 2005/0278420 A1 | 12/2005 | Hartikainen et al. | |
| 2005/0289397 A1* | 12/2005 | Haruki et al. | 714/38 |
| 2006/0020791 A1* | 1/2006 | Laitinen | 713/168 |
| 2006/0079205 A1* | 4/2006 | Semple et al. | 455/411 |
| 2006/0101270 A1 | 5/2006 | Laitinen | |
| 2006/0182280 A1* | 8/2006 | Laitinen et al. | 380/247 |
| 2006/0185003 A1 | 8/2006 | Laitinen et al. | |
| 2006/0205388 A1* | 9/2006 | Semple et al. | 455/411 |
| 2006/0206710 A1* | 9/2006 | Gehrmann | 713/168 |
| 2006/0218396 A1* | 9/2006 | Laitinen et al. | 713/167 |
| 2006/0236106 A1* | 10/2006 | Patel | 713/169 |
| 2006/0251257 A1* | 11/2006 | Haverinen et al. | 380/270 |
| 2007/0230153 A1* | 10/2007 | Tanida et al. | 361/809 |
| 2007/0230453 A1* | 10/2007 | Giaretta et al. | 370/389 |
| 2007/0274522 A1 | 11/2007 | Boman et al. | |
| 2008/0160959 A1 | 7/2008 | Huang et al. | |

OTHER PUBLICATIONS

Translation of Non-Final Rejection dated Oct. 12, 2009, issued by the Korean Intellectual Property Office in connection with counterpart Korean Application No. 10-2007-7025154.

Nokia: "UE triggered unsolicited push from BSF to NAFs", 3GPP Draft; S3-030729, 3rd Generation Partnership Project (3GPP), Mobile Competence Centre; 650, Route DES Lucioles; F-06921 Sophia-Antipolis Cedex; France, vol. SA WG3, No. Munich; Nov. 12, 2003.

3GPP TS 33.330 version 6.4.0, Release 6, ETSI TS 133 220, Universal Mobile Telecommunications System (UMTS); Generic Authentication Arhitecture (GAA); Generic bootstrapping architecture, vol. 3-SA3, No. V6.4.0, Mar. 1, 2005.

3GPP-ETSI TS 133 220 V6.3.0, Universal Mobile Telecommunications System (UMTS); Generic Authentication Architecture (GAA); Generic bootstrapping architecture (3GPP TS 33.220 version 6.3.0 Release 6), Dec. 2004, pp. 1-38.

"UE Triggered Unsolicited Push From BSF to NAFs", 3GPP TSA SA WG3 security-S3#32 S3-040076, Feb. 2004.

3rd Generation Partnership Project; Technical Specification Group Services and System Aspects; Generic Authentication Architecture (GAA); Generic Bootstrapping Architecture (Release 6), 3GPP TS 33.330 V6.4.0, Mar. 2005.

Liberty Alliance Project, "Specifications", downloaded from the Internet: <http://www.projectliberty.org/resources/specifications.php/?f=resources/specifications.php>, retrieved on Jun. 24, 2014.

3GPP TS 33.246, V6.3.0, 3rd Generation Partnership Project; Technical Specification Group Services and System Aspects; 3G Security; Security of Multimedia Broadcast/Multicast Service, Release 6, Jun. 2005.

3GPP TS 33.220, V7.0.0, 3rd Generation Partnership Project; Technical Specification Group Services and System Aspects; Generic Authentication Architecture (GAA); Generic bootstrapping architecture, Release 7, Jun. 2005.

3GPP TS 29.109, V6.3.0, 3rd Generation Partnership Project; Technical Specification Group Core Network and Terminals; Generic Authentication Architecture (GAA); Zh and Zn Interfaces based on the Diameter protocol; Stage 3, Release 6, Jun. 2005.

3GPP TS 29.229, 3rd Generation Partnership Project; Technical Specification Group Core Network and Terminals; Cx and Dx Interfaces based on the Diameter Protocol; Protocol Details, Release 6, Jun. 2005.

3GPP TS 24.109, V6.3.0, 3rd Generation Partnership Project; Technical Specification Group Core Network and Terminals; Bootstrapping interface (Ub) and network application function interface (Ua); Protocol details, Release 6, Jun. 2005.

* cited by examiner

GENERIC KEY-DECISION MECHANISM FOR GAA

CROSS REFERENCE TO RELATED APPLICATION

This application is a continuation application of U.S. patent application Ser. No. 11/184,931 filed on Jul. 20, 2005 now U.S. Pat. No. 8,046,824 entitled, "Generic Key-Decision Mechanism For GAA", which claims the benefit of U.S. Provisional Patent Application Ser. No. 60/669,873 filed on Apr. 11, 2005. The contents of the aforementioned applications are hereby incorporated by reference in their entireties.

BACKGROUND OF THE INVENTION

1. Field of the Invention

This invention is related to a generic mechanism for an application server to determine which key of a Generic Authentication Architecture (GAA) would enable easy integration of additional application servers by extending an existing standard for User Security Settings (USS).

2. Description of the Related Art

Initial authentication (i.e., bootstrapping) of Third Generation Project Partnership (3GPP) Generic Authentication Architecture (GAA) is based on AKA (Authentication and Key Agreement Protocol). Depending on a mobile terminal, such as a mobile phone, and a Universal Mobile Telecommunications System (UMTS) Integrated Circuit Card (UICC) or subscriber identity module inserted in the mobile terminal, the 3GPP Generic Authentication Architecture (GAA) can have the following keys: Ks_int_NAF, Ks_ext_NAF, and Ks_NAF. Today, the number of services using GAA is quite small and a definition as to which key to use for the particular smart card or subscriber identity module can be implemented directly into a server of the Network Application Function (NAF) that offers the service to the user. However, such implementation at the server is not very scalable or easy to administer in case of changes, such as new use cases and changes or updates to existing services, or a user getting a new smart card. The changes or updates to the NAF would require manual configuration, which is especially difficult, if the NAF resides not in the home network of the user or subscriber, but in a third party network.

The Ks_int_NAF key is used for securing Hypertext Transport Protocol (HTTPS) between the smart card or subscriber identity module and the application server NAF. The application would reside in the smart card or subscriber identity module and the mobile terminal would only act as a modem. This mechanism may be used as an alternative to present OTA SMS configuration messages to download new updates or other SAT applications.

The only use case for the Ks_int_NAF key defined today is in Multimedia Broadcast/Multicast Service (MBMS). In MBMS, the NAF is configured according to the definitions in TS33.246 3GPP specification, attached hereto as Appendix A, the contents of which are hereby incorporated by reference. In MBMS, a choice as to which key to use is defined by the description of the specific keys in the specification TS33.246. Therefore for this use case, no key choice mechanism is required because the key is implemented directly into the NAF that is offering the MBMS service to the user.

SUMMARY OF THE INVENTION

According to an embodiment of the present invention, there is provided a method to provide generic mechanism for a network application server. The method includes receiving a request from a user equipment to provide authentication information to a network application function. The method includes determining a key of a generic authentication architecture to integrate additional network application servers by extending an existing standard for user security settings. The method further includes providing the authentication information to the network application function.

According to an embodiment of the present invention, there is provided an apparatus provides generic mechanism for a network application server. Receiving means for receiving a request from a user equipment to provide authentication information to a network application function. Determining means for determining a key of a generic authentication architecture to integrate additional network application servers by extending an existing standard for user security settings. First providing means for providing the authentication information to the network application function.

According to an embodiment of the present invention, there is provided an apparatus provides generic mechanism for a network application server. A receiver receives a request from a user equipment to provide authentication information to a network application function. A determining unit determines a key of a generic authentication architecture to integrate additional network application servers by extending an existing standard for user security settings. A providing unit provides the authentication information to the network application function.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

TABLE OF ABBREVIATIONS

Figure 1:
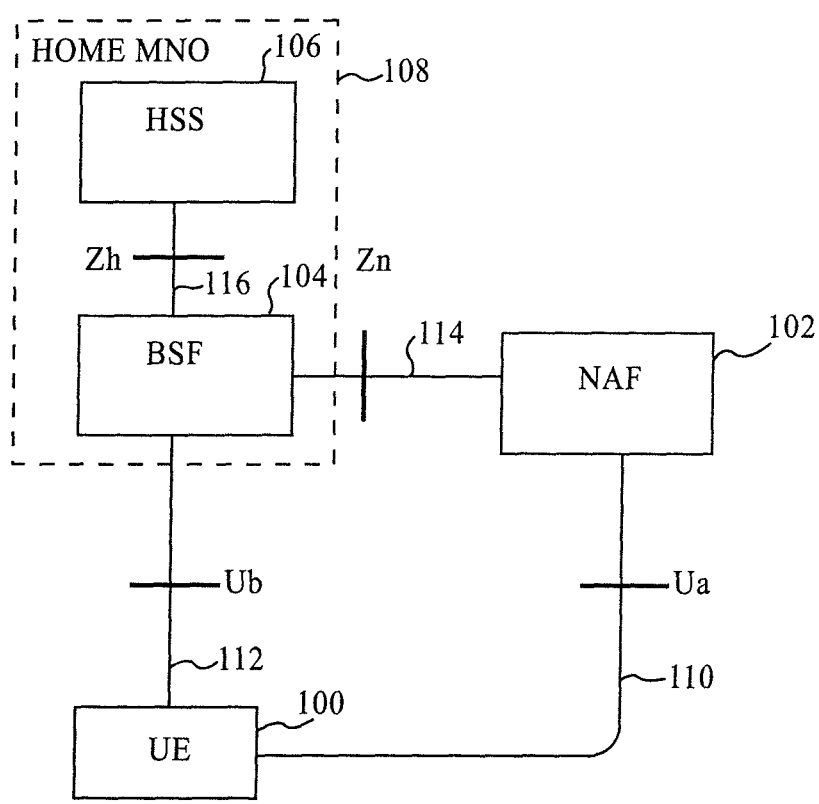
FIG. 1A illustrates an apparatus to provide generic mechanism for a network application server, in accordance with an embodiment of the present invention.
FIG. 1B, illustrates an exemplary network architecture in which a Network Application Function is in a visited network, in accordance with an embodiment of the present invention.

3GPP—3$^{rd}$ Generation Partnership Project
3GPP2—3rd Generation Partnership Project 2
ACM—Address Complete Message
AKA—Authentication and Key Agreement
Auth—Authentication
AUTHR—Authentication Response
AVP—Attribute-Value-Pair
BS—Base Station
BSC—Base Station Controller
BSF—Bootstrapping Server Function
BTS—Base station Transceiver Subsystem
CK—Confidentiality Key CM—Cellular Message
GAA—Generic Authentication Architecture
GBA—Generic Bootstrapping Architecture
GBA_U—GBA with UICC-based enhancements
GUSS—GBA User Security Settings
HSS—Home Subscriber Server
HTTP—Hypertext Transport Protocol
HTTPS—Secured Hypertext Transport Protocol
IK—Integrity Key
IMS—IP Multimedia Subsystem
IMSI—International Mobile Subscriber Identity
IP—Internet Protocol
ISIM—IMS SIM card
Kc—Ciphering Key
Ki—Individual Subscriber Authentication Key
Ks—Key Material
Ks_int_NAF—Derived key in GBA_U which remains on UICC
Ks_ext_NAF—Derived key in GBA_U
Ks_NAF—Derived Key in GBA_ME
MAP—Mobile Application Part
MBMS—Multimedia Broadcast/Multicast Service
ME—Mobile Equipment
MIN—Mobile Identification Number
MNO—Home Mobile Network Operator
MO—Mobile Originated
NAF—Network Application Function
NE—Network Element
OTA—Over The Air
PDSN—Packet Data Service Node
PLC—Private Long Code
PLCM—PLC Mask
PSTN—Public Switched Telephone Network
RAN—Radio Access Network
RAND—Random Challenge Data
SAT—SIM Application Toolkit
SIM—Subscriber Identity Module
SMS—Short Message Service
UE—User Equipment
UICC—UMTS Integrated Circuit Card
UMTS—Universal Mobile Telecommunications System
USIM—Universal SIM card
USS—User Security Settings
Ub—Bootstrapping air interface (from UE to BSF)
Zh—HSS interface from BSF

DETAILED DESCRIPTION OF THE PREFERRED EMBODIMENTS

3GPP is a proposed (3GPP TS 33.220, attached hereto as Appendix B, the contents of which are hereby incorporated by reference) authentication infrastructure. This infrastructure may be utilized to enable application functions in a network side and on a user side to communicate in situations where the network side and the user side would not otherwise be able to communicate. This functionality is referred to as "bootstrapping of application security," or more generally simply as "bootstrapping."

The general principles of bootstrapping are that a generic bootstrapping server function (BSF) allows user equipment (UE) to authenticate therewith, and agree on session keys. Such authentication may be based on authentication and key agreement (AKA). By running AKA, the mobile terminal and the network mutually authenticate each other and agree on keys, specifically a confidentiality key (CK) and an integrity key (IK). After this authentication, the UE and a network application function (NAF), which may also be referred to as a service provider, may run some application specific protocol where the authentication of messages is based on the session keys agreed between the UE and the BSF.

The bootstrapping function is not intended to be dependent upon any particular network application function. The server implementing the bootstrapping function must be trusted by a home operator to handle authentication vectors. Network application functions may be supported in the operator's home network, a visited network, or in a third network.

FIG. 1A illustrates an exemplary network architecture, in accordance with an embodiment of the present invention. The network architecture includes a user equipment (UE) 100, at least one network application function (NAF) 102, a bootstrapping server function (BSF) 104, and a home subscriber system (HSS) 106. The BSF 104 and HSS 106 form part of a home mobile network operator (MNO) 108. The UE 100 connects into the MNO 108 in accordance with well-known mobile communication techniques.

The NAF 102 is hosted in a network element, under the control of the MNO 108, for instance, and the BSF may be also hosted in a network element under the control of the MNO 108. Thus, for practical purposes, each of the NAF 102 and the BSF 104 may be considered to be a network element.

As illustrated in FIG. 1A, the UE 100 communicates with the NAF 102 through a Ua interface 110. The UE 100 communicates with the BSF 104 through an Ub interface 112. The NAF 102 communicates with the BSF 104 through a Zn interface 114. The BSF 104 communicates with the HSS 106 through a Zh interface 116.

Figure 1B:
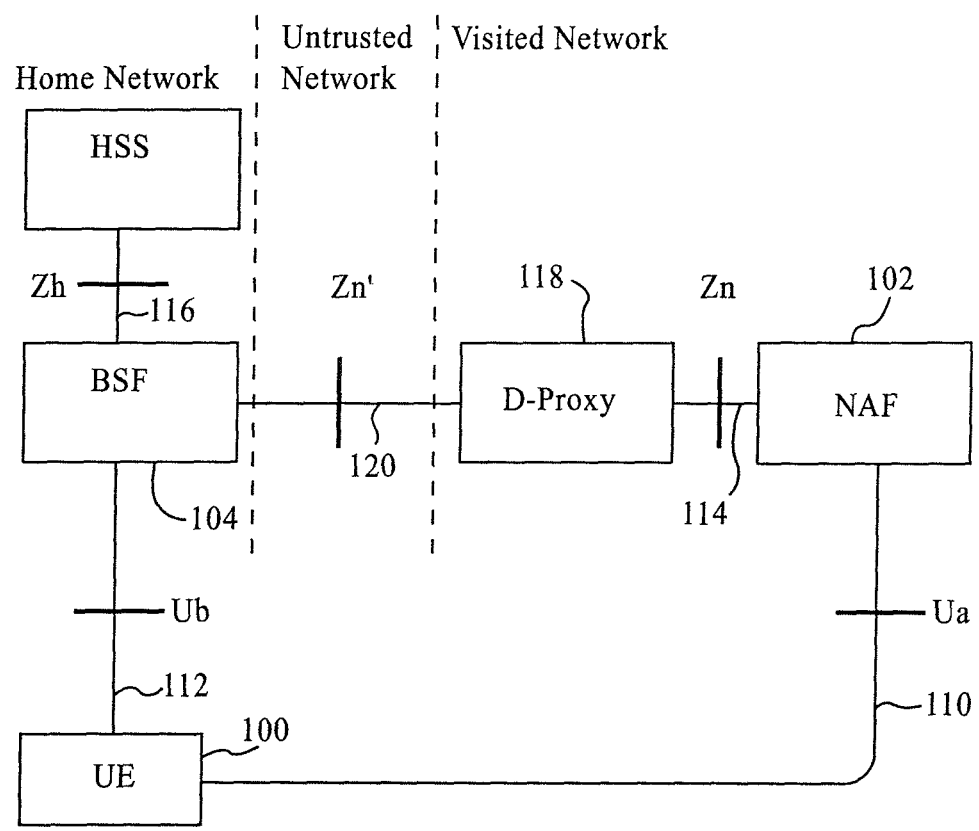

The NAF 102 may be provided in a further separate network. For instance, as illustrated in FIG. 1B, an exemplary network architecture is provided in which NAF 102 is in the visited network. In the case where UE 100 has contacted a NAF 102 that is operated in another network than the home network, this visited NAF 102 shall use a diameter proxy (D-Proxy) 118 of the NAFs network to communicate with subscriber's BSF (i.e. home BSF) 104. The NAF 102 communicates with the BSF 104 through the Zn interface 114 to the D-Proxy 118 and through a Zn' interface 120 to the BSF 104. D-Proxy 118 functionality may be implemented as a separate network element, or be part of any network element (NE) in the visited network that implements Diameter proxy functionality (examples of such NE's are the BSF of the network that the visited NAF 102 belongs to, or an AAA-server).

For FIGS. 1A and 1B, the principle of bootstrapping is that the UE 100 and the bootstrapping function mutually authenticate each other, for instance, using the AKA protocol, and agree on a master shared secret. Afterwards the master shared secret is used to derive one or more network application function specific shared secrets that are applied between the UE 100 and the particular network application functions (NAFs) in question. The NAF specific shared secret key material is generated specifically for each network application function independently. After the bootstrapping operation has been completed, the UE 100 and the network application function may run some specific protocol where the securing of messages will be based on those keys generated during the mutual authentication between the UE 100 and the bootstrapping server function. Thus, the keys may be used for authentication and integrity protection, and for confidentiality. The network application function is then able to acquire the NAF specific shared secret derived from the master shared secret established between the user equipment and the bootstrapping server function.

The communication Ub interface 112 supports the bootstrapping authentication and key agreement protocol, to provide the mutual authentication and key agreement between the UE 100 and the BSF 104. This protocol may be based on the 3GPP AKA protocol, for instance.

The Zh interface 116 allows the BSF 104 to fetch any required authentication information and subscriber profile information from the HSS 106. The Ua interface 110 supports any application specific protocol which is secured using the NAF specific shared secret derived from the master shared secret agreed between the UE 100 and the BSF 104, based on the protocol supported by the Ub interface 112. The Zn interface 114 is used by the NAF 102 to fetch the NAF specific shared secret that has derived from the master shared secret agreed in the protocol supported on the Ub interface 112 from the BSF 104. The Zn interface 114 may also be used to fetch subscriber profile information from the BSF 104.

A message transmitted from BSF 104 to the NAF 102 includes bootstrapping information. The bootstrapping information may include a transaction identifier, a NAF specific shared secret, and optional subscriber profile information ("prof_naf" or "any NAF specific USSs"). The NAF specific shared secret, denoted Ks_NAF, is established between the UE 100 and the BSF 104, and may be modified for specific use for communications between the UE 100 and the specific NAF. Ks_NAF is derived from Ks by using parameters specified in 3GPP TS 33.220 Annex B (Appendix A). Ks is the master shared secret, and Ks_NAF is a NAF specific shared secret. The bootstrapping information transmitted to each NAF is thus unique to that NAF, in accordance with the specific shared secret Ks_NAF for that NAF.

A set of all user security settings (GUSS) contains the BSF specific information element and the set of all application-specific USSs. The set of all user security settings (USSs), i.e. GUSS, is stored in the HSS. In the case where the subscriber has multiple subscriptions, i.e., multiple ISIM or USIM applications on the UICC, the HSS shall contain one or more GUSSs that can be mapped to any one or more identities, e.g. (IP Multimedia Private Identity) IMPIs and (International Mobile Subscriber Identity) IMSIs.

A deployment of new use case for a two NAF specific shared secrets in GBA_U in which one is used on UICC (Ks_int_NAF) and other is used in the mobile equipment (Ks_ext_NAF). This use case needs some "decision logic" which key to take, i.e., Ks_int_NAF, or Ks_ext_NAF. Additions of new services to this 'logic' should be possible without new configuration of a smart card in a mobile terminal. In case the NAF support more than one key type, any sort of downplay of security level attack needs to be prevented. This downplay attack can be that the NAF is tricked into using a key of lower level of security instead of requiring the use of the Ks_int_NAF.

According to an embodiment of the present invention, there is provided a generic mechanism for an application server to obtain knowledge as to which key of a Generic Authentication Architecture (GAA) would enable easy integration of additional application servers by extending an existing standard for User Security Settings (USS). AVP Attribute-Value-Pairs (AVPs) are defined in 3GPP TS 29.109 GAA Zn interface Bootstrapping-Info-Request/Answer messages, attached hereto as Appendix C, the contents of which are hereby incorporated by reference, and additional new Diameter AVP are defined in 3GPP TS 29.229, attached hereto as Appendix D, the contents of which are hereby incorporated by reference.

A generic mechanism may be implemented by hard coding or locally configuring of a key usage directly into the software in every NAF during NAF set-up (local in NAF), by hard coding of the key usage in BSF (BSF dictates by only delivering the relevant key to NAF), by providing an additional field(s) in the user security setting (USS) stored in Home Subscriber Server (HSS) that are transferred to the BSF, and/or by using the AVP stored in BSF that indicates key usage. If the BSF would only deliver the relevant keys to the NAF, the NAF would not be aware of the provided quality of security and the key type it is using.

The 3GPP standardized and existing User Security Settings (USS) could be extended and be used to indicate which key to use. This would provide the user's home-operator with full and flexible control, especially in the case that the service is offered by a third party NAF and the billing of the service is done by the home-operator.

In accordance with an embodiment of the present invention, there may be at least two embodiments possible. In a first embodiment of the present invention, the USS could indicate what type of smart card or secure environment a user has. Also, the first embodiment would provide whether mobile subscriber's Universal SIM (USIM), IMS SIM card (ISIM) is GBA_U enabled or not. In the first embodiment, there may be a flag field, which indicates whether the card or secure environment is GBA_U enabled.

In a second embodiment of the present invention, the USS may include one or two authorization flag fields that are transported in an USS of an existing specification 3GPP TS 29.109, attached hereto as Appendix D, the contents of which are hereby incorporated by reference. In the first flag field, if this field is present and indicates the usage of UICC based shared secret (Ks_int_NAF) is mandatory. The second flag field may be an optional field, where if this second flag field is present and indicates the ME based shared secret (Ks_ext_AF or Ks_NAF) usage.

If the mobile subscriber is provisioned by a home operator with a new subscriber identity module, then the USS can easily be updated to require that from now on the more secure Ks_int_NAF key is used. Both alternatives prevent security downplay attacks, i.e., Ks_ext_NAF key being used instead of the more secure Ks_int_NAF key.

Figure 2:
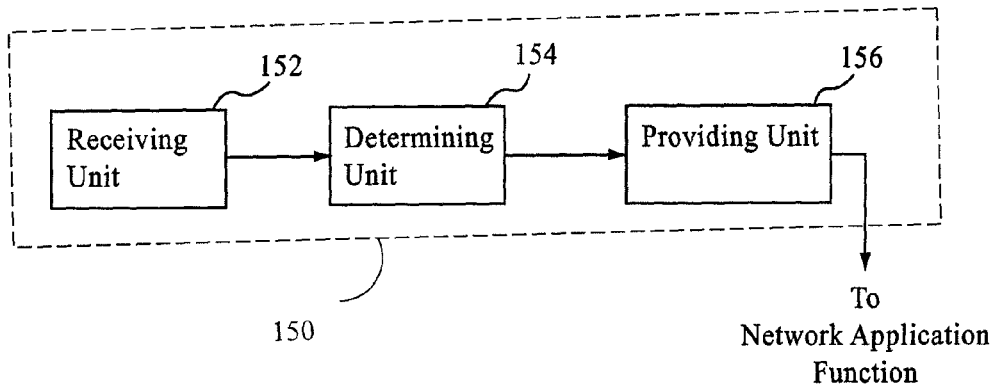
FIG. 2 illustrates an apparatus to provide generic mechanism for a network application server, in accordance with an embodiment of the present invention.

FIG. 2 illustrates an apparatus 150 to provide generic mechanism for a network application server, in accordance with an embodiment of the present invention. The apparatus 150 includes a receiving unit 152 for receiving a request from a user equipment to provide authentication information to a network application function. The apparatus 150 further includes a determining unit 154 for determining a key of a generic authentication architecture to integrate additional network application servers by extending an existing standard for user security settings. The apparatus 150 also includes a first providing unit 156 for providing the authentication information to the network application function.

Figure 3:
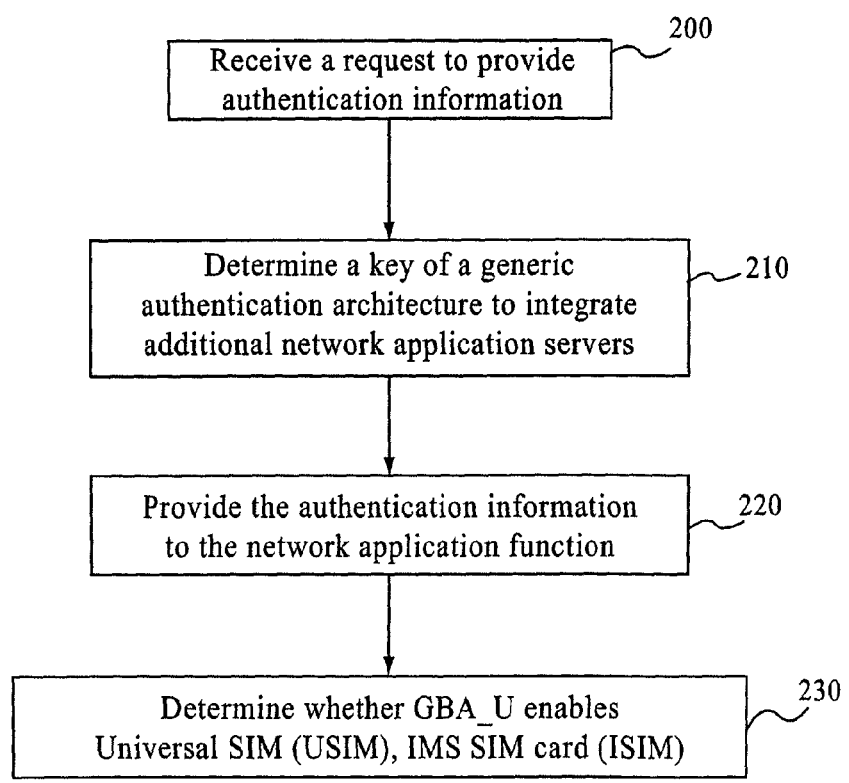
FIG. 3 illustrates a method to provide generic mechanism for a network application server, in accordance with an embodiment of the present invention.

FIG. 3 illustrates a method to provide generic mechanism for a network application server, in accordance with an embodiment of the present invention. At operation 200, the method receives a request from a user equipment to provide authentication information to a network application function. At operation 210, the method determines a key of a generic authentication architecture to integrate additional network application servers by extending an existing standard for user security settings. At operation 220, providing the authentication information to the network application function. In accordance with an embodiment of the present invention, the USS could indicate what type of smart card a user has, or what type (i.e., Ks_ext_NAF or Ks_int_NAF), of shared secret must be used. At operation 230, the method determines whether mobile subscriber's Universal SIM (USIM), IMS SIM card (ISIM) or other secure environment is GBA_U enabled or not. In the first embodiment, there may be a flag field, which indicates whether the card or secure environment is GBA_U enabled.

Figure 4:
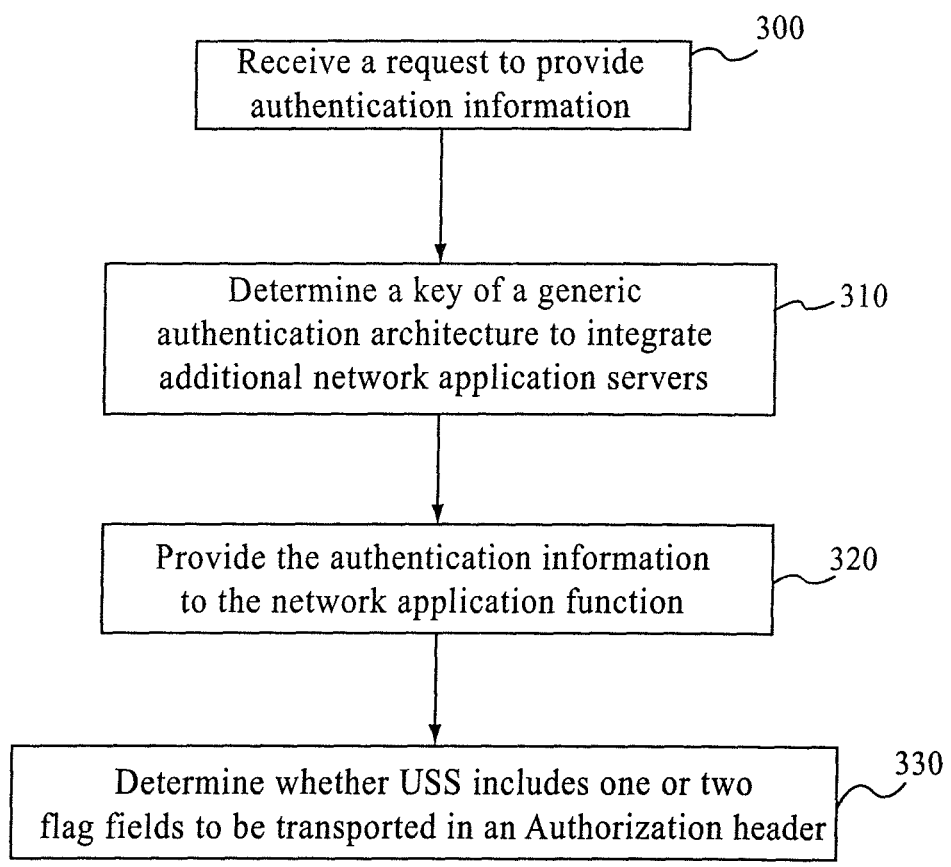
FIG. 4 illustrates a method to provide generic mechanism for a network application server, in accordance with an alternative embodiment of the present invention.

FIG. 4 illustrates a method to provide generic mechanism for a network application server, in accordance with an alternative embodiment of the present invention. At operation 300, the method receives a request from a user equipment to provide authentication information to a network application function. At operation 310, the method determines a key of a generic authentication architecture to integrate additional network application servers by extending an existing standard for user security settings. At operation 320, providing the authentication information to the network application function. In accordance with an embodiment of the present invention, the USS could indicate what type of smart card or secure environment a user has, or what type of shared secret must be used. At operation 330, the method determines whether the USS includes one or two flag fields to be transported in the Authorization header of the existing specification 3GPP TS 29.109, attached hereto as Appendix C. In the first flag field, if this field is present it indicates the usage of UICC based shared secret (Ks_int_NAF) is mandatory. The second flag field may be an optional field, where if this second flag field is present and indicates the ME based shared secret (Ks_ext_AF or Ks_NAF) usage.

If a new application server is set-up in the operator network, it does not need to know which key to use for which user or if the user will be provisioned in the near future with a new SIM card. The NAF would obtain the needed key choice information from the BSF.

In accordance with an embodiment of the present invention, a new AVP could be used to indicate the type of derived key being used. For instance, the new AVP may indicate if the derived key is Ks_int_NAF or some other key type. The new AVP would indicate either if the card or secure environment is GBA_U enabled or, as an alternative, which key to use. Depending on the flag, the NAF may use the UICC based shared secret key (Ks_int_NAF) when indicated. That is, the AVP indicates that a card or secure environment is GBA_U enabled or the AVP indicates explicitly the usage of Ks_int_AF. The NAF would then require that this key be used and not some other key with lower level of security.

For a web server in the secure environment, for instance a smart card, a client would reside in a Universal Mobile Telecommunications System (UMTS) Integrated Circuit Card (UICC) and the application would also reside in the secure environment. This would typically be a Java application, an XML application, a C++ application, a Perl application, or a Visual Basic application or other similar types of applications. Then, the UICC may also act as the application server offering a web service towards other entities which where one of them might reside in another trustworthy domain, e.g., a second secure area in the phone and the Ks_int_NAF may be used to secure communications between web service entities. The UICC based NAF would take the role of a WSP (Web Service Provider) as outlined by the Liberty Alliance Web Service Framework Specification (ID-WSF). The UICC may act as a Liberty Alliance conformant web service provider providing a requesting entity (i.e., a web service consumer) with sensitive information, which can be authenticated/secured via Ks_int_NAF. The other GAA based keys maybe used further in the web service framework for identification and message security. Furthermore, TS24.109 3GPP specifies bootstrapping interface (Ub) and network application function interface (Ua), attached hereto as Appendix E, the contents of which are hereby incorporated by reference TS29.109 3GPP specifies Zh and Zn interfaces based on a diameter protocol, attached hereto as Appendix F, the contents of which are hereby incorporated by reference.

The present invention may allow the home-operator of the subscriber to have full control over the used security level. The update of the user security settings in case the user has a new UICC could happen centrally in a Home Service Server (HSS) and it would not be required to update all NAFs individually. Decision logic may reside in the operator controlled HSS or BSF. Further, security downplay attacks would also no longer be possible for new applications.

The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed:
1. An apparatus comprising:
a receiver unit configured to receive a request from a user equipment to provide authentication information to a network application function;
a determiner unit configured to determine a key of a generic authentication architecture to integrate additional network application servers by extending an existing standard for user security settings, wherein determining the key includes determining from provided data a key type the network application function is required to use, the provided data being based, at least in part, on data indicating the key type included in the extended user security settings provided by a home subscriber server; and
a provider unit configured to provide the authentication information to the network application function.
2. The apparatus as recited in claim 1, further comprising:
a second provider unit configured to provide a type of secure environment in the user equipment in the user security settings.
3. The apparatus as recited in claim 1, further comprising:
a second provider unit configured to provide first and second flag fields in the user security settings that are transported in an authorization header of a specification, wherein in the first flag field, a first derived key in integrated circuit based enhancements is used, and in the second flag field, a second derived key or a third derived key are used.
4. The apparatus as recited in claim 1, further comprising:
a second provider unit configured to provide a flag field indicative of whether a generic bootstrapping architecture with integrated circuit based enhancements enables a universal subscriber identity module, subscriber identity module, secure environment, or a subscriber identity module card.
5. A method comprising:
sending, by a user equipment, a request to provide authentication information to a network application function, wherein the request initiates a determination of a key of a generic authentication architecture to integrate additional network application servers by extending an existing standard for user security settings, wherein the request further initiates the determination of, based on at least in part data indicating the key type included in the extended user security settings provided by a home subscriber server, a key type for use by the network application function.

6. An apparatus comprising:
at least one processor;
at least one memory including computer program code which when executed by the at least one processor is configured to at least send a request to provide authentication information to a network application function, wherein the request initiates a determination of a key of a generic authentication architecture to integrate additional network application servers by extending an existing standard for user security settings, wherein the request further initiates the determination of, based on at least in part data indicating the key type included in the extended user security settings provided by a home subscriber server, a key type for use by the network application function.

7. A non-transitory computer-readable medium including code, which when executed by a processor, provides operations comprising:
sending, by a user equipment, a request to provide authentication information to a network application function, wherein the request initiates a determination of a key of a generic authentication architecture to integrate additional network application servers by extending an existing standard for user security settings, wherein the request further initiates the determination of, based on at least in part data indicating the key type included in the extended user security settings provided by a home subscriber server, a key type for use by the network application function.

* * * * *